(12) United States Patent
Lee et al.

(10) Patent No.: US 11,218,270 B2
(45) Date of Patent: Jan. 4, 2022

(54) METHOD FOR TRANSMITTING AND RECEIVING SYSTEM INFORMATION VIA A BROADCAST CHANNEL (BCH) AND A DOWNLINK SHARED CHANNEL (DL_SCH)

(71) Applicant: LG Electronics Inc., Seoul (KR)

(72) Inventors: Young-Dae Lee, Anyang (KR); Sungduck Chun, Anyang (KR); Sung Jun Park, Anyang (KR); Seung June Yi, Anyang (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 16/594,553

(22) Filed: Oct. 7, 2019

(65) Prior Publication Data

US 2020/0036498 A1 Jan. 30, 2020

Related U.S. Application Data

(63) Continuation of application No. 15/633,024, filed on Jun. 26, 2017, now Pat. No. 10,439,783, which is a (Continued)

(30) Foreign Application Priority Data

Jan. 28, 2008 (KR) .................. 10-2008-0008631

(51) Int. Cl.
*H04L 5/00* (2006.01)
*H04W 28/06* (2009.01)
(Continued)

(52) U.S. Cl.
CPC .......... *H04L 5/0053* (2013.01); *H04L 1/1812* (2013.01); *H04L 5/003* (2013.01);
(Continued)

(58) Field of Classification Search
CPC ... H04L 5/0053; H04L 1/1812; H04L 5/0005; H04L 5/003
See application file for complete search history.

(56) References Cited

U.S. PATENT DOCUMENTS 6,665,313 B1 12/2003 Chang et al.
6,697,347 B2 2/2004 Ostman et al.
(Continued)

FOREIGN PATENT DOCUMENTS

CN 1518236 8/2004
CN 1613210 5/2005
(Continued)

OTHER PUBLICATIONS

"Universal Mobile Telecommunications System (UMTS); High Sped Downlink Packet Access (HSDPA); Overall description; Stage 2 (3GPP TS 25.308 version 7.1.0 Release 7); ETSI TS 125 308" ETSI Standards, vol. 3-R2, No. V7.1.0, Dec. 1, 2006 XP014039997.
(Continued)

*Primary Examiner* — Chandrahas B Patel
(74) *Attorney, Agent, or Firm* — Fish & Richardson P.C.

(57) ABSTRACT

A method for receiving system information, the method includes receiving, by a mobile terminal, a first block of second system information from a base station, wherein the first block of second system information includes scheduling information related to a plurality of second blocks of second system information; determining, by the mobile terminal, on which resource the plurality of second blocks of second system information is received using the scheduling information; and receiving, by the mobile terminal, the plurality of second blocks of second system information from the base station on the determined resource.

16 Claims, 5 Drawing Sheets

Related U.S. Application Data continuation of application No. 14/539,874, filed on Nov. 12, 2014, now Pat. No. 9,712,307, which is a continuation of application No. 14/099,538, filed on Dec. 6, 2013, now Pat. No. 9,130,721, which is a continuation of application No. 12/577,136, filed on Oct. 9, 2009, now Pat. No. 8,798,635, which is a continuation of application No. 12/523,869, filed as application No. PCT/KR2008/000532 on Jan. 29, 2008, now Pat. No. 9,008,672.

(60) Provisional application No. 60/900,652, filed on Feb. 8, 2007, provisional application No. 60/887,550, filed on Jan. 31, 2007.

(51) Int. Cl.

| | | |
|---|---|---|
| *H04W 48/16* | (2009.01) | |
| *H04W 48/12* | (2009.01) | |
| *H04W 72/00* | (2009.01) | |
| *H04W 84/04* | (2009.01) | |
| *H04L 1/18* | (2006.01) | |
| *H04W 4/06* | (2009.01) | |
| *H04W 92/10* | (2009.01) | |

(52) U.S. Cl.
CPC .......... *H04L 5/0005* (2013.01); *H04W 28/06* (2013.01); *H04W 48/12* (2013.01); *H04W 48/16* (2013.01); *H04W 72/005* (2013.01); *H04W 84/042* (2013.01); *H04W 4/06* (2013.01); *H04W 92/10* (2013.01)

(56) References Cited

U.S. PATENT DOCUMENTS

| | | | |
|---|---|---|---|
| 7,006,464 B1 | 2/2006 | Gopalakrishnan et al. | |
| 7,158,504 B2 | 1/2007 | Kadaba et al. | |
| 7,200,124 B2 * | 4/2007 | Kim ................. | H04W 36/0094 370/280 |
| 7,260,079 B1 | 8/2007 | Chapman et al. | |
| 7,286,500 B1 | 10/2007 | Bhatoolaul et al. | |
| 7,295,573 B2 | 11/2007 | Yi et al. | |
| 7,330,732 B2 | 2/2008 | Wilborn et al. | |
| 7,512,153 B2 | 3/2009 | Kwon et al. | |
| 7,650,559 B2 | 1/2010 | Nishibayashi et al. | |
| 7,743,310 B2 | 6/2010 | Nishibayashi et al. | |
| 7,844,884 B2 | 11/2010 | Roh et al. | |
| 8,059,681 B2 | 11/2011 | Kim et al. | |
| 8,208,492 B2 | 6/2012 | Kim et al. | |
| 8,254,299 B2 * | 8/2012 | Kim ................. | H04W 72/005 370/312 |
| 2002/0048281 A1 | 4/2002 | Yi et al. | |
| 2003/0040314 A1 | 2/2003 | Hogan et al. | |
| 2003/0095519 A1 | 5/2003 | Kuo et al. | |
| 2003/0157953 A1 | 8/2003 | Das et al. | |
| 2003/0179738 A1 | 9/2003 | Diachina et al. | |
| 2003/0181221 A1 | 9/2003 | Nguyen | |
| 2003/0189912 A1 | 10/2003 | Laitinen et al. | |
| 2003/0210669 A1 | 11/2003 | Vayanos et al. | |
| 2003/0231612 A1 | 12/2003 | Kim et al. | |
| 2004/0081125 A1 | 4/2004 | Ranta-Aho et al. | |
| 2004/0103435 A1 | 5/2004 | Yi et al. | |
| 2004/0146067 A1 | 7/2004 | Yi et al. | |
| 2004/0162071 A1 | 8/2004 | Grilli et al. | |
| 2004/0202143 A1 | 10/2004 | Diachina et al. | |
| 2004/0228294 A1 | 11/2004 | Kim et al. | |
| 2004/0266461 A1 | 12/2004 | Beckmann et al. | |
| 2005/0058078 A1 | 3/2005 | Jung et al. | |
| 2005/0068900 A1 | 3/2005 | Stephens et al. | |
| 2005/0074024 A1 | 4/2005 | Kim et al. | |
| 2005/0111487 A1 | 5/2005 | Matta | |
| 2005/0237960 A1 | 10/2005 | Kim | |
| 2006/0092911 A1 | 5/2006 | Hwang et al. | |
| 2006/0092973 A1 | 5/2006 | Petrovic et al. | |
| 2006/0140158 A1 | 6/2006 | Terry | |
| 2006/0152083 A1 | 7/2006 | Fuhr et al. | |
| 2006/0245386 A1 | 11/2006 | Hu | |
| 2006/0251019 A1 | 11/2006 | Dalsgaard et al. | |
| 2006/0251105 A1 | 11/2006 | Kim et al. | |
| 2007/0047452 A1 | 3/2007 | Lohr et al. | |
| 2007/0064657 A1 | 3/2007 | Wu et al. | |
| 2007/0091810 A1 | 4/2007 | Kim et al. | |
| 2007/0293222 A1 | 12/2007 | Vikberg et al. | |
| 2008/0101270 A1 | 5/2008 | Kekki et al. | |
| 2008/0144556 A1 | 6/2008 | Rinne | |
| 2008/0259862 A1 | 10/2008 | Yeo et al. | |
| 2008/0304588 A1 | 12/2008 | Pi | |
| 2009/0005042 A1 * | 1/2009 | Bi ................. | H04W 48/10 455/436 |
| 2009/0016275 A1 | 1/2009 | Liu et al. | |
| 2009/0028123 A1 | 1/2009 | Terry et al. | |
| 2009/0221293 A1 | 9/2009 | Petrovic et al. | |
| 2010/0046437 A1 | 2/2010 | Nishibayashi et al. | |
| 2010/0091721 A1 | 4/2010 | Larmo et al. | |
| 2015/0249140 A1 | 9/2015 | Shroff et al. | |

FOREIGN PATENT DOCUMENTS

| | | |
|---|---|---|
| CN | 1735089 | 2/2006 |
| EP | 1168759 | 1/2002 |
| EP | 1432261 | 6/2004 |
| EP | 1553798 | 7/2005 |
| EP | 1720322 | 11/2006 |
| EP | 1755355 | 2/2007 |
| EP | 1843504 | 10/2007 |
| EP | 1845649 | 10/2007 |
| EP | 1845650 | 10/2007 |
| JP | 2002-527945 | 8/2002 |
| JP | 2005-525065 | 8/2005 |
| JP | 2006-524444 | 10/2006 |
| KR | 10-2002-0000649 | 1/2002 |
| KR | 10-2002-0014939 | 2/2002 |
| KR | 10-2005-0073237 | 7/2005 |
| KR | 10-2006-0087355 | 8/2006 |
| KR | 10-2006-0090134 | 8/2006 |
| RU | 2280327 | 4/2005 |
| RU | 2004126160 | 1/2006 |
| RU | 2322765 | 4/2008 |
| TW | 1256215 | 6/2006 |
| WO | WO 97/11566 | 3/1997 |
| WO | WO 98/24250 | 6/1998 |
| WO | WO 00/21253 | 4/2000 |
| WO | WO 02/093296 | 11/2002 |
| WO | WO 03/085874 | 10/2003 |
| WO | WO 03/092320 | 11/2003 |
| WO | WO 03/096149 | 11/2003 |
| WO | WO 03/096567 | 11/2003 |
| WO | WO 2005/048613 | 5/2005 |
| WO | WO 2005/119941 | 12/2005 |
| WO | WO 2006/022876 | 3/2006 |
| WO | WO 2006/083149 | 8/2006 |
| WO | WO 2006/105333 | 10/2006 |
| WO | WO 2006/118418 | 11/2006 |
| WO | WO 2007/068304 | 6/2007 |

OTHER PUBLICATIONS

"Universal Mobile Telecommunications System (UMTS); User Equipment (UE) procedures in idle mode and procedures for cell reselection in connected mode (3GPP TS 25.304 version 7.1.0 Release 7); ETSI TS 125 304" ETSI Standards, vol. 3-R2, No. V7.1.0, Dec. 1, 2006 XP014039981.

3GPP, "3GPP TR 25.813 v7.1.0, 3rd Generation Partnership Project; Technical Specification Group Radio Access Network; Evolved Universal Terrestrial Radio Access (E-UTRA) and Evolved Universal Terrestrial . . . ," Sep. 2006, pp. 1-41.

3GPP, 3GPP TS 25.322 V7.2.0, 3rd Generation Partnership Project; Technical Specification Group Radio Access Network; Radio Link Control (RLC) protocol specification (Release 7), Sep. 2006, pp. 1-80.

(56) References Cited

OTHER PUBLICATIONS

3rd Generation Partnership Project; Technical Specification Group Radio Access Network; Radio Link Control (RLC) protocol specification (Release 7), 3GPP Standard; 3GPP TS 25.322, XP050367794, Sep. 1, 2006, pp. 1-80.
An English abstract is provided for RU-2004132193-A.
Ericsson, "Scheduling of System Information," 3GPP TSG-RAN WG2 Meeting #56bis, R2-070220, Jan. 15-20, 2007, pp. 1-4.
Ericsson: "E-UTRA Downlink Control Signaling—Open Issues", 3GPP TSG-RAN WG1, R1-061365 [online], May 8, 2006, XP050102238, <URL:http://www.3gpp.org/FTP/tsg_ran/WG1_RL1/TSGR1_45/Docs/R1-061365.zip>, section 2.
Ericsson: Scheduling of System Information, R2-070220, XP050133321, 3rd Generation Partnership Project (3GPP) TSG-RAN WG2 Meeting #56bis, Jan. 15-20, 2007; Sorrento Italy.
Erisccon: "Uplink HARQ-ARQ Interactions for NACK-> ACK Error", 3GPP TSG-RAN WG2, R2-063238 [online], Nov. 6, 2006, XP050132733, URL:http://www.3gpp.org/ftp/tsg_ran/WG2_RL2/TSGR2_56/Documents/R2-063238.zip>, Fig. 1, p. 2.
Hermann et al., "Improving Packet Loss Probability in the UMTS High-Speed Downlink", In: IEEE Vehicular Technology conference, VTC 2003 Fall, 2003, New York: IEEE, Oct. 6, 2003, pp. 2655-2659, XP010701537.
LG Electronic: "Downlink control signaling", 3GPP TSG-RAN WG1, R1-063177 [online], Nov. 6, 2006, XP050103632, <URL:http://www.3gpp.org/ftp/tsg_ran/WG1_RL1/TSGR1_47/Docs/R1-063177.zip>, sections 1, 2.
LG Electronics, "LTE System Information," TSG-RAN Working Group 2 #53, May 8-12, 2006, pp. 1-4, R2-061476.
Nokia (Rapporteur), "System Information Classification," 3GPP TSG-RAN WG2 Meeting #56, R2-063077, Nov. 6-10, 2006, pp. 1-7.
Nokia (Rapporteure): "System Information Classification", 3GPP Draft; R2-063077 Si Classification, 3rd Generation Partnership Project (3GPP), XP050132586, Nov. 6-10, 2006; Riga Latvia.
Nokia: "ARQ Operation With HARQ-ARQ Interactions", 3GPP TSG-RAN WG2, R2-062765 [online], Oct. 9, 2006, XP003012349, <URL:http://www.3gpp1.com/ftp/tsg_ran/WG2_RL2/TSGR2_55/Documents/R2-062765.zip>, sections 2, 3.
Qualcomm Europe, "Design and Performance of BCH for E-UTRA," 3GPP TSG RAN1#46bis, R1-062688, Oct. 9-13, 2006, pp. 1-7.
Qualcomm Europe: "Design and Performance of BCH for U-UTRA", XP050103177, GPP Draft; R1-062688, 3rd Generation Partnership Project (3GPP), TSG-RAN1 Meeting #46bis, Oct. 9-13, 2006; Seoul, Korea.
Rapporteur (Motorola): "Report of E-Mail Discussion: DL Scheduling", 3GPP TSG-RAN WG1 R1-063684 [online], Dec. 12, 2006, XP050133082, <URL:http://www.3gpp.org/ftp/tsg_ran/WG2_RL2/TSGR2_56/Documents/R2-063684.zip>, section 2, annex C.
Samsung: "DL Control Channel Structure: Overview", 3GPP TSG-RAN WG1, R1-062534 [online], Oct. 9, 2006, <URL:http://www.3gpp.org/ftp/tsg_ran/wg1_rl1/TSGR1_46bis/Docs/R1-062534.zip>, sections 1-4.
Samsung: "MAC functions: ARG", 3GPP TSG-RAN WG2, R2-060374 [online], Feb. 13, 2006, XP002488423, <URL:ftp//ftp.3gpp.org/tsg_ran/WG2_RL2/TSGR2_51/Documents/R2-060374.zip>, section 2.
Sharp: UE Identity in L 1/L2 Control Signaling for Downlink Scheduling Resource Allocation:, 3GPP TSG-RAN WG2, R2-061129 [online], May 8, 2006, XP050131084, <URL:http://www.3gpp1.com/ftp/tsg_ran/WG2_RL2/TSGR2_53/Do sections 1-3.
Texas Instruments: "Control Channel Structure and Coding in E-UTRA Downlink", 3GPP TSG-RAN WG1, R1-063220 [online], Nov. 6, 2006, XP050103675, <URL:http://www.3gpp.org/ftp/tsg_ran/WG1_RL/TSGR1_47/Docs?R1-063177.zip>, sections 1-5.
Huawei, "Further Considerations on Broadcast Information Scheduling," TSG-RAN WG2 Meeting #53, Shanghai, China, May 8-12, 2006, R2-061426, 2 pages.
ITRI, "BCH load reduction by sharing with DL-SCH," 3GPP TSG RAN WG2 meeting #53, Shanghai, China, May 8-12, 2006, R2-061247, 3 pages.
Siemens, "E-UTRA BCH Structure and Procedures, 20 MHz BW Mapping," 3GPP TSG-RAN WG1 #46bis, Seoul, Korea, Oct. 9-13, 2006, Tdoc R1-062743, pp. 1-6.

* cited by examiner

METHOD FOR TRANSMITTING AND RECEIVING SYSTEM INFORMATION VIA A BROADCAST CHANNEL (BCH) AND A DOWNLINK SHARED CHANNEL (DL_SCH)

CROSS-REFERENCE TO RELATED APPLICATIONS

This application is a continuation of U.S. patent application Ser. No. 15/633,024, filed on Jun. 26, 2017, now allowed, which is a continuation of U.S. patent application Ser. No. 14/539,874, filed on Nov. 12, 2014, now U.S. Pat. No. 9,712,307, which is a continuation of U.S. patent application Ser. No. 14/099,538, filed on Dec. 6, 2013, now U.S. Pat. No. 9,130,721, which is a continuation of U.S. patent application Ser. No. 12/577,136, filed on Oct. 9, 2009, now U.S. Pat. No. 8,798,635, which is a continuation of U.S. patent application Ser. No. 12/523,869, filed on Jul. 21, 2009, now U.S. Pat. No. 9,008,672, which is the National Phase of PCT International Application No. PCT/KR2008/000532, filed on Jan. 29, 2008, which claims the benefit under 35 U.S.C. § 119(e) to U.S. Provisional Application No. 60/900,652, filed on Feb. 8, 2007 and 60/887,550, filed on Jan. 31, 2007, and under 35 U.S.C. § 119(a) to Korean Patent Application No. 10-2008-0008631, filed on Jan. 28, 2008, all of which are hereby expressly incorporated by reference into the present application.

BACKGROUND OF THE INVENTION

Field of the Invention

The present invention relates to transmission and reception of system information and, more particularly, to transmission and reception of system information in an E-UTRAN system.

Discussion of the Related Art

Figure 1:
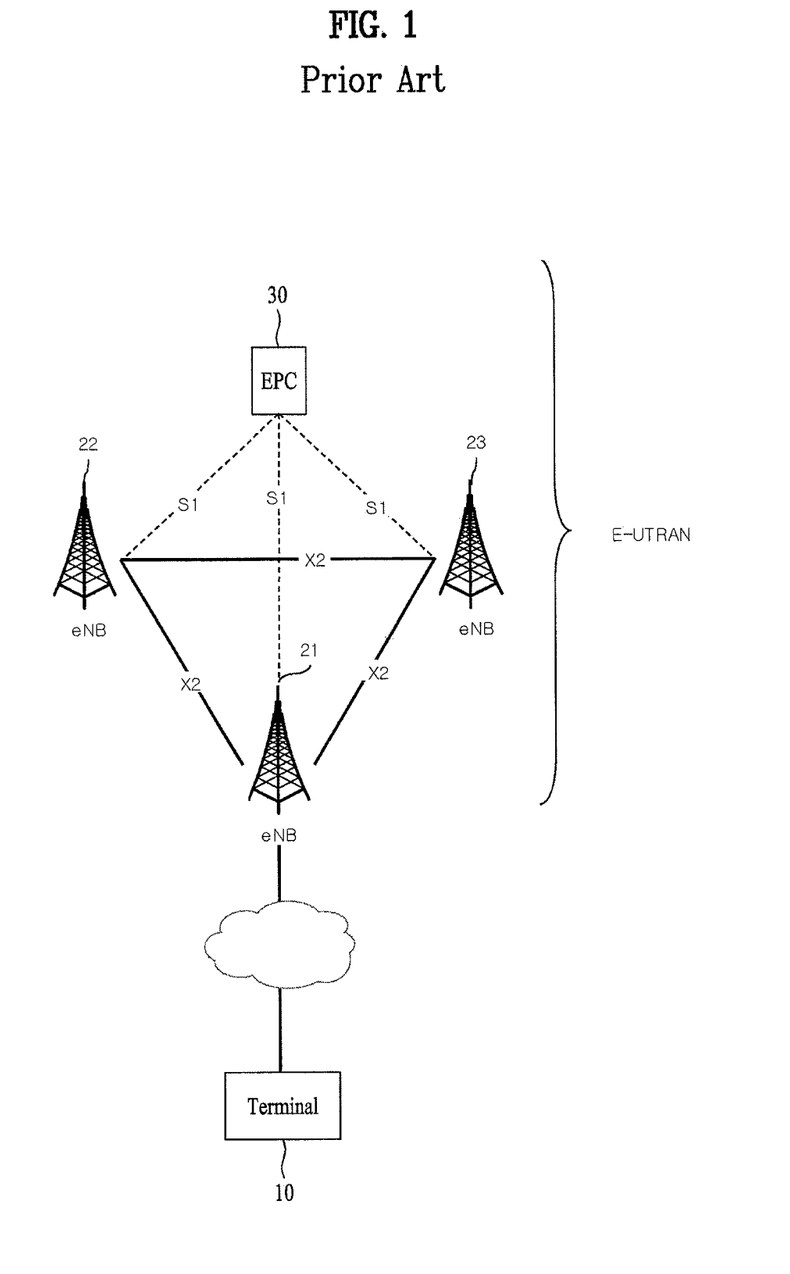
FIG. 1 is an exemplary view showing the structure of a E-UTRAN, the related art mobile communication system.

FIG. 1 illustrates an exemplary structure of a general E-UTRAN (Evolved Universal Terrestrial Radio Access Network) system according to the related art and the present invention.

The E-UTRAN system as shown in FIG. 1 has been evolved from the conventional UTRAN system and a third generation partnership project (3GPP) currently proceeds with basic standardization operations. The E-UTRAN system is also called an LTE (Long Term Evolution) system The E-UTRAN system includes base stations (eNode Bs or eNBs) 21 to 23, and the eNBs 21 to 23 are connected via an X2 interface. The eNBs 21 to 23 are connected with a terminal (or user equipment (UE)) 10 via a radio interface and connected to an EPC (Evolved Packet Core) 30 via an S1 interface.

Layers of a radio interface protocol between the terminal 100 and a network may be divided into a first layer L1, a second layer L2, and a third layer L3 based on the three lower layers of an open system interconnection (OSI) standard model which is widely known in communication systems. A physical layer belonging to the first layer among the three lower layers provides an information transfer service using a physical channel, and a radio resource control (RRC) layer positioned at the third layer serves to control radio resources between the UE and the network. For this, the RRC layer exchanges an RRC message between the UE and the network.

Figure 2:
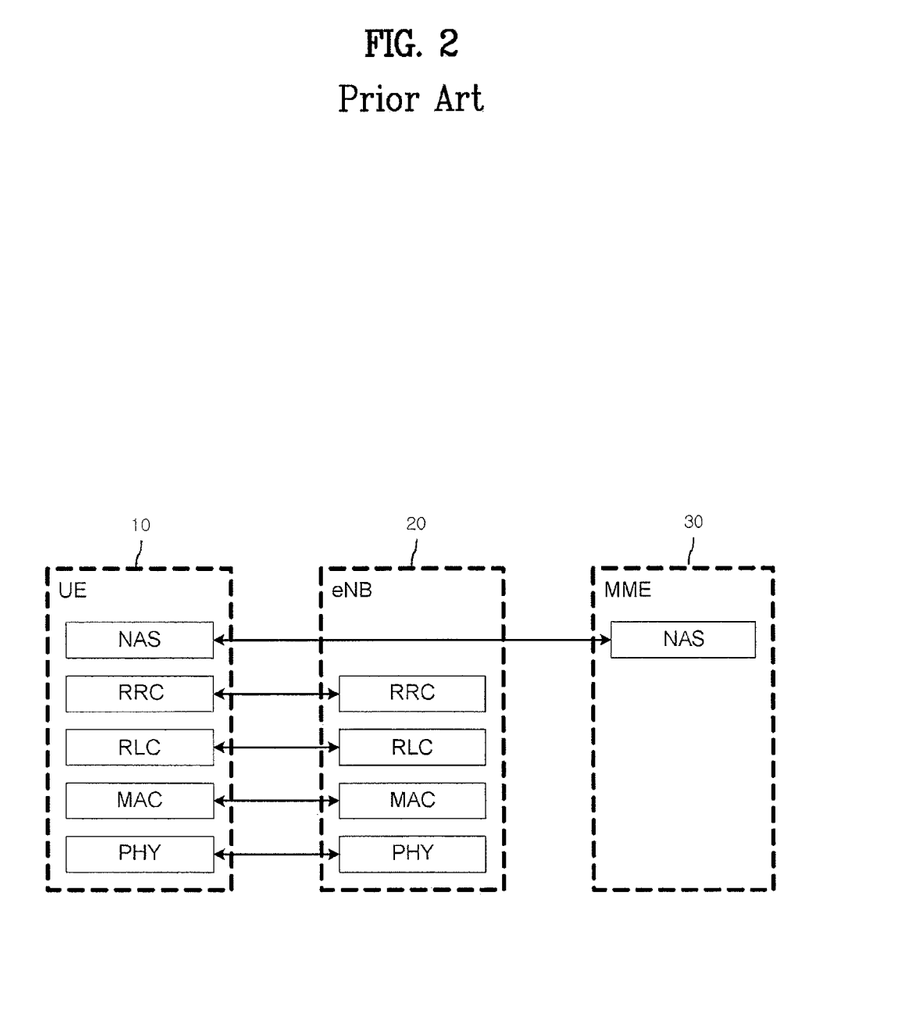
FIG. 2 is an exemplary view showing the structure of a radio interface protocol between a terminal and a UTRAN based on 3GPP radio access network standards.
Figure 3:
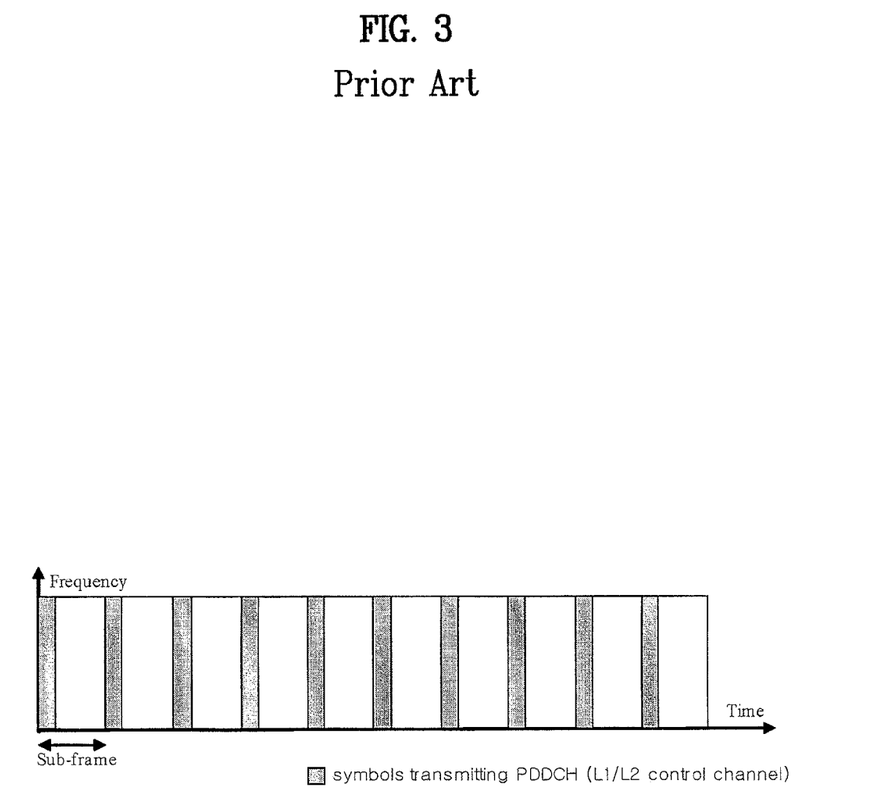
FIG. 3 is an exemplary view showing a physical channel.

FIG. 2 illustrates the structure of a radio interface protocol between the UE and a UTRAN (UMTS Terrestrial Radio Access Network) according to the 3GPP radio access network (RAN) standards. FIG. 3 is an exemplary view of a physical channel.

The radio interface protocol as shown in FIG. 2 has horizontal layers comprising a physical layer, a data link layer, and a network layer. The radio interface protocol has vertical planes comprising a user plane (U-plane) for transmitting data information and a control plane (C-plane) for transferring control signaling.

The protocol layers in FIG. 2 may be divided into a first layer L1, a second layer L2, and a third layer L3 based on the three lower layers of the open system interconnection (OSI) standard model which is widely known in communication systems.

The physical layer, namely, the first layer L1, provides information transfer service to an upper layer by using a physical channel. The physical layer is connected to an upper layer called a medium access control (MAC) layer via a transport channel. The physical layer transfers data to the MAC layer via the transport channel.

Data is transferred via the physical channel between different physical layers, namely, between a physical layer of a transmitting side and that of a receiving side. The physical channel is demodulated according to an OFDM (Orthogonal Frequency Division Multiplexing) method, and utilizes time and frequency as radio resources.

The second layer L2 is divided into two lower layers. Namely, the second layer is divided into a MAC layer and an RLC layer. The MC layer provides a service to the RLC layer, the upper layer, via a logical channel. The RLC layer supports a reliable data transmission. Here, the function of the RLC layer may be implemented as a function block within the MAC layer. In such a case, the RLC may not exist.

Although not shown, the second layer further comprises a PDCP layer. The PDCP layer performs a function called header compression that reduces the size of a header of an IP packet, which is relatively large and includes unnecessary control information, in order to effectively transmit the IP packet such as an IPv4 or IPv6 in a radio interface having a smaller bandwidth.

The RRC layer corresponding to the third layer is defined only in the control plane, and controls a logical channel, a transport channel and a physical channel in relation to configuration, reconfiguration, and the release of radio bearers (RBs). In this case, the RBs refer to a service provided by the second layer for data transmission between the UE 10 and the UTRAN. When an RRC connection is made between the RRC layer of the UE 10 and that of the radio network, the UE 100 is defined to be in an RRC connected mode, or otherwise, the UE 100 is defined to be in an idle mode.

A NAS (Non-Access Stratum) layer exists at an upper position of the RRC layer. The NAS layer performs a function of session management, mobility management, etc.

The physical channel, the transport channel, and the logical channel will now be described in more detail.

First, each cell formed by each of the eNBs 21 to 23 is set with one of bandwidths 1.25 Mhz, 2.5 Mhz, 5 Mhz, 10 Mhz, 20 Mhz, etc., and provides downlink or uplink physical channel to several terminals. In this case, the mutually different cells may be set to provide each different bandwidth.

As noted with reference to FIG. 3, the physical channel comprises several sub-frames of a time axis and several sub-carriers of a frequency axis. Here, a single sub-frame comprises a plurality of symbols at the time axis. A single sub-frame comprises a plurality of resource blocks, and a single resource block comprises a plurality of symbols and a plurality of sub-carriers. Each sub-frame may use particular sub-carriers of particular symbols (e.g., a first symbol) of a corresponding sub-frame for a PDCCH (Physical Downlink Control Channel), namely, an L1/L2 control channel. A single sub-frame is 0.5 ms, and a TTI (Transmission Time Interval), a unit time for data transmission, is 1 ms corresponding to two sub-frames.

Next, the transport channel includes a downlink transport channel for transmitting data from a network to a terminal and an uplink transport channel for transmitting data from the terminal to the network. The downlink transport channel for transmitting data from the network to the terminal includes a broadcast channel (BCH) for transmitting system information, a paging channel (PCH) for transmitting a paging message, and a downlink shared channel (SCH) for transmitting user traffic or a control message. The downlink multicast, traffic of a broadcast service or a control message may be transmitted via the downlink SCH or a separate downlink MCH (Multicast Channel).

The uplink transport channel for transmitting data from the terminal to the network includes a random access channel (RACH) for transmitting an initial control message and an uplink SCH for transmitting other user traffic or a control message.

The logical channel is mapped to the transport channel and includes a BCCH (Broadcast Channel), a PCCH (Paging Control Channel), a CCCH (Common Control Channel), an MCCH (Multicast Control Channel0, an MTCH (Multicast Traffic Channel), etc.

In the above-described related art, the base station transmits the system information via the static channel, namely, via the BCH. However, in order to statically transmit the system information, allocation of radio resources needs to be always maintained. This makes the radio resources used very inefficiently, and thus, the radio resources are insufficient always.

SUMMARY OF THE INVENTION

Therefore, it is an object of the present invention to reduce a waste of radio resources by dynamically transmitting system information.

To achieve the above object, in the present invention, system information is divided into first to third blocks, the first block is transmitted via a static broadcast channel and the second and third blocks are transmitted via a dynamic broadcast channel, thereby effectively transmitting the system information.

In detail, in order to achieve the above object, there is provided a method for transmitting system information from a base station to terminals of a cell, including: transmitting a first block of system information to a terminal via a static broadcast channel; transmitting a second block of the system information to the terminal via a dynamic broadcast channel in a certain time interval after the first block is transmitted; and transmitting a third block of the system information to the terminal via the dynamic broadcast channel.

In order to achieve the above object, there is also provided a method for receiving system information by a mobile terminal from a base station, including: receiving a first block of system information from the base station via a static broadcast channel; receiving a second block of the system information from the base station via a dynamic broadcast channel in a certain time interval according to a value included in the first block after the first block is received; and receiving a third block of the system information from the base station via the dynamic broadcast channel based on information included in the second block.

Preferably, the terminal may receive information about the second block via the first block, and receive information about the third block via the second block.

Preferably, the terminal may acquire control information regarding the third block via the second block and via a control channel of the dynamic broadcast channel.

Preferably, the dynamic broadcast channel is a channel that shares radio resources with user data, and the static broadcast channel is a channel that does not share radio resources with the user data.

Preferably, the static broadcast channel is a channel that does not share radio resources with data other than the system information.

Preferably, the dynamic broadcast channel is a channel whose transfer rate can be changed, and the static broadcast channel is a channel whose transfer rate is not changed.

Preferably, the dynamic broadcast channel is a channel that is accompanied with a supplementary control channel, and the static broadcast channel is a channel that is not accompanied with a supplementary control channel.

DETAILED DESCRIPTION OF THE INVENTION

The embodiment of the present invention will now be described with reference to the accompanying drawings.

Figure 4:
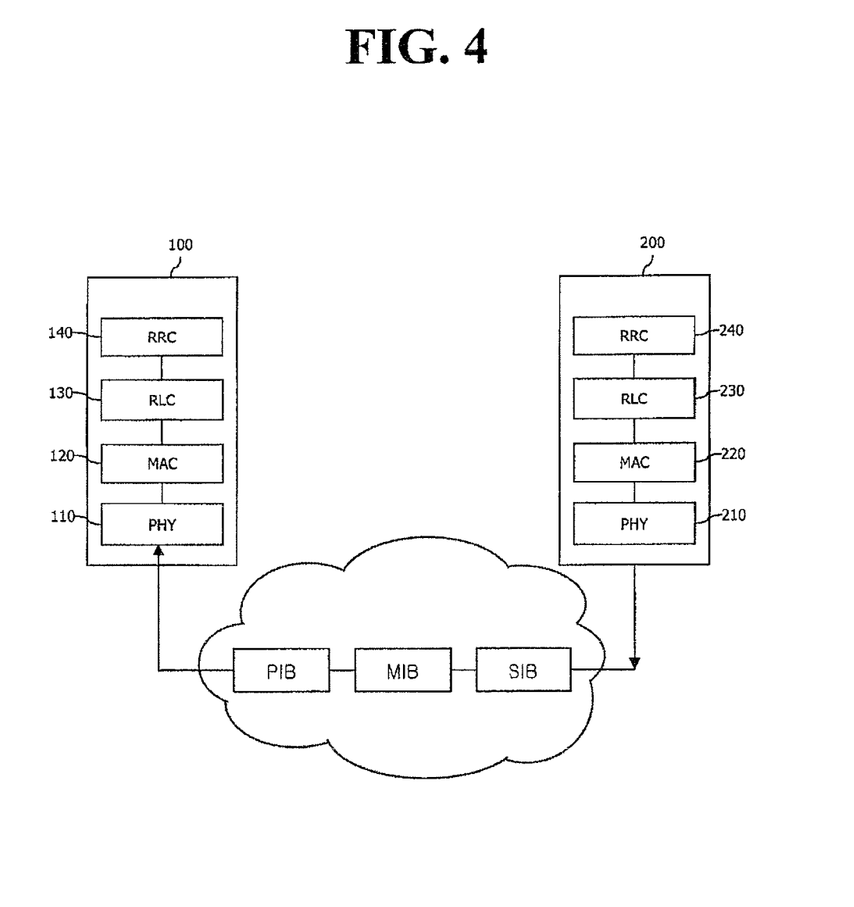
FIG. 4 is an exemplary view showing a terminal 100 and a base station (or eNB) 200 according to the present invention.
Figure 5:
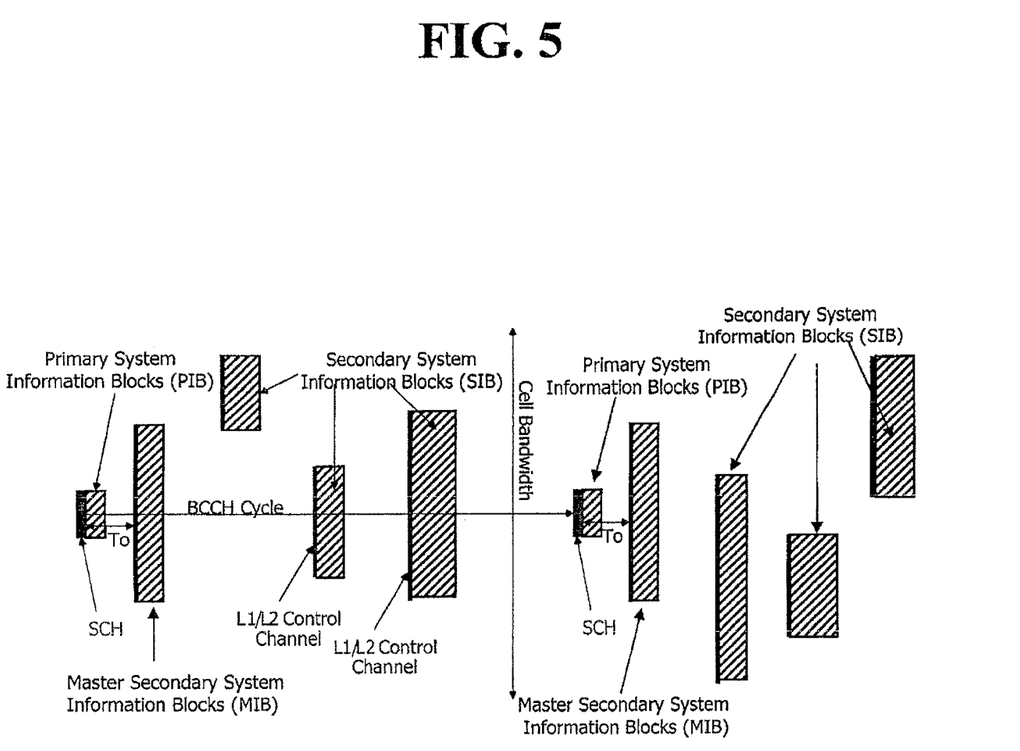
FIG. 5 is an exemplary view showing transmission of system information according to the present invention.

FIG. 4 is an exemplary view showing a terminal 100 and a base station (or eNB) 200 according to the present invention, and FIG. 5 is an exemplary view showing transmission of system information according to the present invention.

As noted with reference to FIG. 4, a base station (or eNB) 200 according to the present invention divides system information into first to third blocks, transmits the first block via a static broadcast channel and the second and third blocks via a dynamic broadcast channel, to thus effectively transmit the system information. Here, the static broadcast channel may be a channel that does not share radio resources with data other than the system information. The dynamic broadcast channel may be a channel that shares radio resources with user data. In addition, the dynamic broadcast channel may be a channel whose transfer rate is varied, and the static broadcast channel maybe a channel that has a fixed transfer rate. Or, the dynamic broadcast channel may be a channel that is accompanied with a control channel, and the static broadcast channel may be a channel that is not accompanied with a control channel. For example, the static broadcast channel may be a P-BCH (Primary Broadcast Channel), and the dynamic broadcast channel may be a D-BCH (Dynamic Broadcast Channel), an S-BCH (Secondary Broadcast Channel), or a DL SCH (Downlink Shared Channel).

In detail, the base station (or eNB) 200 divides the system information into a first block, i.e., a PIB (Primary system Information Block), a second block, i.e., an MIB (Master secondary system Information Block), a third block, i.e., an SIB (Secondary system Information Block). Here, the PIB provides information about the MIB, and the MIB provides information about the SIB.

Accordingly, the terminal 100 can obtain the information about the MIB by receiving the PIB from the base station (or eNB) 200 and receive the MIB using the obtained information about the MIB. In addition, the terminal can obtain the information about the SIB by receiving the MIB and receive the SIB using the obtained information about the SIB.

This will now be described in more detail with reference to FIG. 5.

As shown in FIG. 5, the PIB, initial system information that can be obtained after the SCH, can be obtained after the terminal 100 performs cell searching in a particular cell. Such PIB may include only static information in the cell. In this case, once the terminal 100 accurately receives the PIB one time in the particular cell, it does not need to receive the PIB again in the corresponding cell. The PIB is periodically transmitted via a static broadcast channel. A single PIB is broadcast in a single cell, and the PIB is periodically transmitted following a SyncCH (Synchronization Channel).

The PIB may include the following information:
Bandwidth of a current cell
MIB indication information (Reference): The MIB indication information (Reference) includes a difference (i.e., time interval) between a transmission time of the PIB and that of the MIB ('To' in FIG. 5), and parameters of physical layer for receiving the MIB. Here, the value 'To' may be different to be used for each cell or according to a bandwidth of a cell. Or, the value 'To' may be fixed as a particular value in every LTE system. If the value 'To' is fixed as a particular value, it does not need to be transmitted through the PIB. Namely, if the MIB is statically transmitted and if, for example, a frequency and a time for transmitting the MIB are fixed, the PIB may not include the MIB indication information.

PLMN ID, BCCH cycle information: The PIB may additionally include PLMN ID and BCCH cycle information. The BCCH cycle is a cycle in which system information is transmitted through the BCCH (Broadcast Control Channel). For example, the BCCH cycle is a cycle of transmission of the PIB or the MIB. Or, the BCCH cycle is a cycle of transmission of the SynCH channel.

Value tag: The PIB may additionally include a Value tag. The Value tag indicates a changed matter of the PIB, the MIB, the SIB, etc. Thus, the terminal 100 may recognize whether or not the PIB, the MIB, the SIB, etc., has been changed through content of the Value tag. If the PIB does not include the Value tag, the Value tag may be included in the MIB.

The MIB is periodically transmitted via a dynamic broadcast channel. Only a single MIB is periodically transmitted in a single cell. The MIB may include the following information:

Value tags with respect to PIB, MIB, SIB, etc: If the PIB does not include a value tag, the value tag may be included in the MIB. The value tag indicates a changed matter of the PIB, the MIB, the SIB, etc. Thus, the terminal 100 may recognize whether or not the PIB, the MIB, the SIB, etc., has been changed through content of the MIB.

SIB indication information (Reference): The SIB indication information includes information about SIBs transmitted in a corresponding BCCH cycle in which a corresponding MIB is transmitted, for example, pointers for various SIBs, namely, one or more of transmission scheduling information of Ms and parameters of physical layer for receiving Ms.

Cell access restriction parameters (PLMN id, Tracking Area id, cell barring, etc.)

RACH (Random Access Channel) access information: The MIB may include information on accessing a RACH.

The MIB is transmitted following the PIB. The MIB is transmitted in time difference by the value 'To' from the PIB. In this case, if the value 'To' is fixed, the terminal 100 may recognize that the MIB is transmitted in a time frame after 'To' from the PIB transmission frame. However, even if the value 'To' is not fixed, because the PIB indicates a frame of a dynamic BCH channel through the MIB is transmitted, the terminal 100 can recognize a frame through the MIB is transmitted, by receiving the PIB.

An L1/L2 control channel, namely, a PDCCH, indicates within which resource block the MIB is comprised, among resource blocks in the frame indicated by the value 'To'. The terminal 100 receives the L1/L2 control channel in the frame, and receives a specific resource block in the frame corresponding to the MIB according to the control information transmitted by the L1/L2.

A bandwidth in which the MIB is transmitted may be fixed. In this case, the MIB transmission bandwidth may be set to be different depending on the size of a cell bandwidth.

The MIB is dynamically scheduled in the frame. Accordingly, unicast data and the MIB may be transmitted by dynamically sharing radio resources. In this case, the L1/L2 control channel provides control information about the transmission of the unicast and transmission of the MIB and dynamically schedules the unicast and the MIB together.

The MIB may be re-transmitted using Hybrid ARQ method without uplink feedback information. In this case, control information about the re-transmission may be transferred via the L1/L2 control channel or the PIB to the terminal 100.

The SIB (Secondary system Information Block) may include various system information which are not included in the PIB and the MIB. For example, the SIB may include setting information of a common channel or a shared channel, call transmission information, a cell select parameter, a positioning parameter, an MBMS parameter, etc.

The SIB is periodically transmitted via a dynamic broadcast channel, for example, via a dynamic BCH. Mutually different SIBs may be periodically broadcast in each different cycle according to requirements for each SIB. In this case, the information on cycle of the SIBs may be transmitted via the MIB as mentioned above. Namely, as described above, the MIB informs about frames of the dynamic broadcast channel through which the SIBs are transmitted by using a pointer with respect to the Ms. And where the SIBs are located in the informed frame is indicated by the L1/L2 control channel, namely, the PDCCH. Accordingly, the SIBs may be dynamically scheduled within the frames.

Accordingly, the terminal 100 may know the frame in which the particular SIB is transmitted by receiving the MIB. And the terminal 100 receives the L1/L2 control channel in the frame indicated in the MIB, and receives a resource block in which the SIB is comprised according to the control information transmitted by the L1/L2 control channel.

The SIB may be re-transmitted using Hybrid ARQ method without uplink feedback information. In this case, the control information with respect to the re-transmission may be transferred to the terminal 100 via the L1/L2 control channel or the PIB or the MIB.

The transmission and reception of the PIB, the MIB and the SIB will now be described.

An RRC 240 of the eNB 200 divides the system information into the first to third blocks and transmits each block via the static broadcast channel or the dynamic broadcast channel.

In detail, the RRC 240 of the eNB 200 transmits the PIB corresponding to the first block via the static broadcast channel, and the MIB corresponding to the second block and the SIB corresponding to the third block via the dynamic broadcast channel.

Second layers 220 and 230, lower layers of the RRC layer 240 of the eNB, transfer the PIB, which has been transmitted via the static broadcast channel, to a physical layer 210 as it is without adding a header of the second layer. Meanwhile, the second layers 220 and 230 of the eNB may segment or concatenate the MIB or the SIB transmitted via the dynamic broadcast channel, and add a header of the second layer to the MIB or the SIB and transfer the same to the physical layer 210. The added header includes information about segmentation or concatenation which has been applied for the MIB or the SIB.

A physical layer 110 of the terminal 100 receives the PIB via the static channel. For example, the terminal 100 receives the PIB via the static broadcast channel following an SCH (Synchronization Channel). And, the physical layer 110 of the terminal 100 transfers the received PIB to the second layers 120 and 130 of the terminal. The second layers 120 and 130 transfer the received PIB to an RRC layer 140 as it is. The terminal 100 acquires indication information about the MIB through the PIB.

The terminal 100 receives a frame including the MIB via the dynamic broadcast channel according to the indication information. And, the terminal checks where a transmission block including the MIB is located in the frame via the L1/L2 control channel, namely, the PDCCH, of the frame, and receives the transmission block according to a checked position. The physical layer 110 of the terminal 100 transfers the transmission block including the MIB to the second layers 120 and 130, and the second layers 120 and 130 reassemble the transmission block based on a header of the second layers added to the block. The second layers 120 and 130 of the terminal 100 transfer the reassembled MIB to the RRC layer 140. The RRC layer 140 checks instruction matters with respect to the SIBs included in the MIB, namely, pointers with respect to the SIBS, and instructs the physical layer 110 to receive the SIBs.

The physical layer 110 receives a frame including the SIB via the dynamic broadcast channel according to the pointer with respect to the SIB. And, the terminal 100 checks where the transmission block including the SIB is located in the frame through the L1/L2 control channel of the frame, and receives the transmission block according to the checked position.

Then, the physical layer 100 transfers the transmission block including the SIB to the second layers 120 and 130, and the second layer 120 and 130 reassemble the transmission block based on the header of the second layers added to the block. The second layers 120 and 130 of the terminal transfer the reassembled SIB to the RRC layer 140.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As so far described, in the present invention, because system information is divided into first to third blocks and transmitted, it can be effectively transmitted.

In addition, the first block is transmitted via a static broadcast channel while the second and third blocks are transmitted via a dynamic broadcast channel, so the radio resources can be effectively used.

What is claimed is:

1. A method for a network transmitting system information, the method comprising:
    transmitting, by the network, a block of first system information on a broadcast channel (BCH) to a mobile terminal;
    transmitting, by the network, a first block of second system information on a downlink shared channel (DL-SCH) to the mobile terminal, wherein the first block of second system information includes cell access related information and scheduling information related to a plurality of second blocks of second system information;
    transmitting, by the network, information on a L1/L2 control channel to the mobile terminal; and
    transmitting, by the network, the plurality of second blocks of second system information to the mobile terminal through a resource of the DL-SCH in accordance with the scheduling information of the first block of second system information and the information on the L1/L2 control channel.

2. The method of claim 1, wherein the scheduling information includes periodicity information of each of the second blocks.

3. The method of claim 1, wherein the first block of second system information is transmitted after a predetermined time difference after the block of first system information is transmitted.

4. The method of claim 1, wherein the block of first system information includes at least one of bandwidth information and parameter information about a physical layer.

5. The method of claim 1, wherein the plurality of second blocks of second system information further include at least one of:
    paging information,
    a cell select related information,
    a positioning related information, and
    a Multimedia Broadcast Multicast Service (MBMS) related information.

6. The method of claim 1, wherein the first block of second system information further includes value tag information, and
    wherein the cell access related information includes at least one of Public Land Mobile Network (PLMN) identity information, tracking area information, and cell barred information.

7. The method of claim 1, wherein one of the plurality of second blocks of second system information further includes value tag information.

8. The method of claim 1, wherein the plurality of second blocks of second system information transmitted to the mobile terminal are configured to carry user traffic.

9. A network apparatus for transmitting system information, the apparatus comprising:
a transmitter and a receiver;
a processor that controls the transmitter and the receiver to:
transmit a block of first system information on a broadcast channel (BCH) to a mobile terminal;
transmit a first block of second system information on a downlink shared channel (DL-SCH) to the mobile terminal, wherein the first block of second system information includes cell access related information and scheduling information related to a plurality of second blocks of second system information;
transmit information on a L1/L2 control channel to the mobile terminal; and
transmit the plurality of second blocks of second system information to the mobile terminal through a resource of the DL-SCH in accordance with the scheduling information of the first block of second system information and the information on the L1/L2 control channel.

10. The apparatus of claim 9, wherein the scheduling information includes periodicity information of each of the second blocks.

11. The apparatus of claim 9, wherein the processor transmits the first block of second system information after a predetermined time difference after the block of first system information is transmitted.

12. The apparatus of claim 9, wherein the block of first system information includes at least one of bandwidth information and parameter information about a physical layer.

13. The apparatus of claim 9, wherein the plurality of second blocks of second system information further include at least one of:
paging information,
a cell select related information,
a positioning related information, and
a Multimedia Broadcast Multicast Service (MBMS) related information.

14. The apparatus of claim 9, wherein the first block of second system information further includes value tag information, and
wherein the cell access related information includes at least one of Public Land Mobile Network (PLMN) identity information, tracking area information, and cell barred information.

15. The apparatus of claim 9, wherein one of the plurality of second blocks of second system information further includes value tag information.

16. The apparatus of claim 9, wherein the plurality of second blocks of second system information transmitted to the mobile terminal are configured to carry user traffic.

* * * * *